Figure 4:
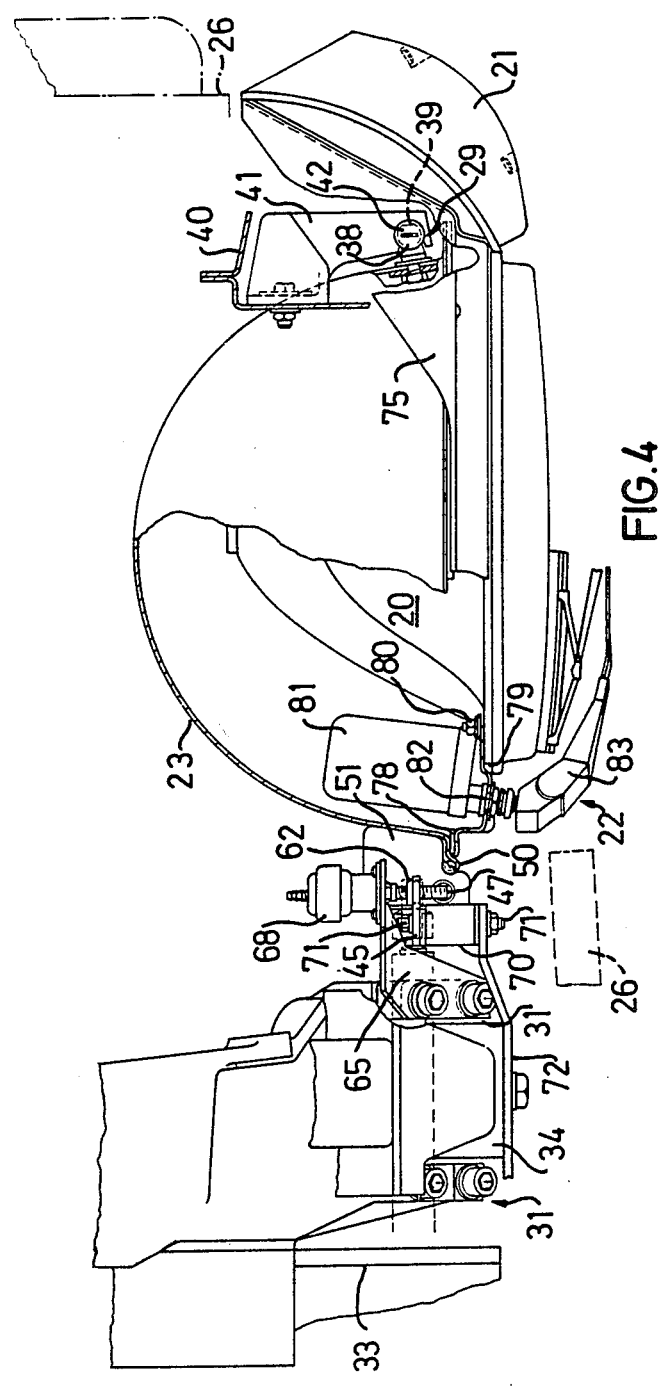

United States Patent [19]

Pettersson et al.

[11] 4,194,236
[45] Mar. 18, 1980

[54] ARRANGEMENT FOR A LIGHTING UNIT IN VEHICLES

[75] Inventors: Axel J. M. Pettersson, Södertälje; Rolf K. Johansson, Trosa, all of Sweden

[73] Assignee: Saab-Scania Aktiebolag, Södertälje, Sweden

[21] Appl. No.: 874,224

[22] Filed: Feb. 1, 1978

[30] Foreign Application Priority Data

Feb. 3, 1977 [SE] Sweden ................... 7701202

[51] Int. Cl.² .............................................. B60Q 1/04
[52] U.S. Cl. ................................. 362/66; 362/61; 362/83; 362/287
[58] Field of Search ................ 362/64, 61, 66, 67, 362/71, 83, 287

[56] References Cited

U.S. PATENT DOCUMENTS

| 3,370,162 | 2/1968 | Biabaud | 362/71 |
| 3,790,771 | 2/1974 | Tixier | 362/71 |
| 3,846,627 | 11/1974 | Chastain | 362/71 |
| 3,925,656 | 12/1975 | Andres et al. | 362/71 |
| 4,102,712 | 7/1978 | Martin | 362/71 |

FOREIGN PATENT DOCUMENTS 628476 3/1936 Fed. Rep. of Germany.
701858 4/1938 Fed. Rep. of Germany.

*Primary Examiner*—Howard A. Birmiel
*Attorney, Agent, or Firm*—Cushman, Darby & Cushman

[57] ABSTRACT

In a vehicle a bodywork portion, e.g. a driver's cabin, is movably mounted on a supporting vehicle chassis. The bodywork portion carries a lighting unit which, when the bodywork portion is in its normal position, moves together with the chassis, independent of movements performed by the bodywork portion relative to the chassis. When the bodywork portion is tilted around a transverse axis to a raised position the lighting unit is also tilted, together with the bodywork portion. The result is that the lighting unit can be given a high location and yet, when in use, moves only together with the chassis. In the bodywork portion no extra room is needed to allow tilting of the bodywork portion.

8 Claims, 5 Drawing Figures

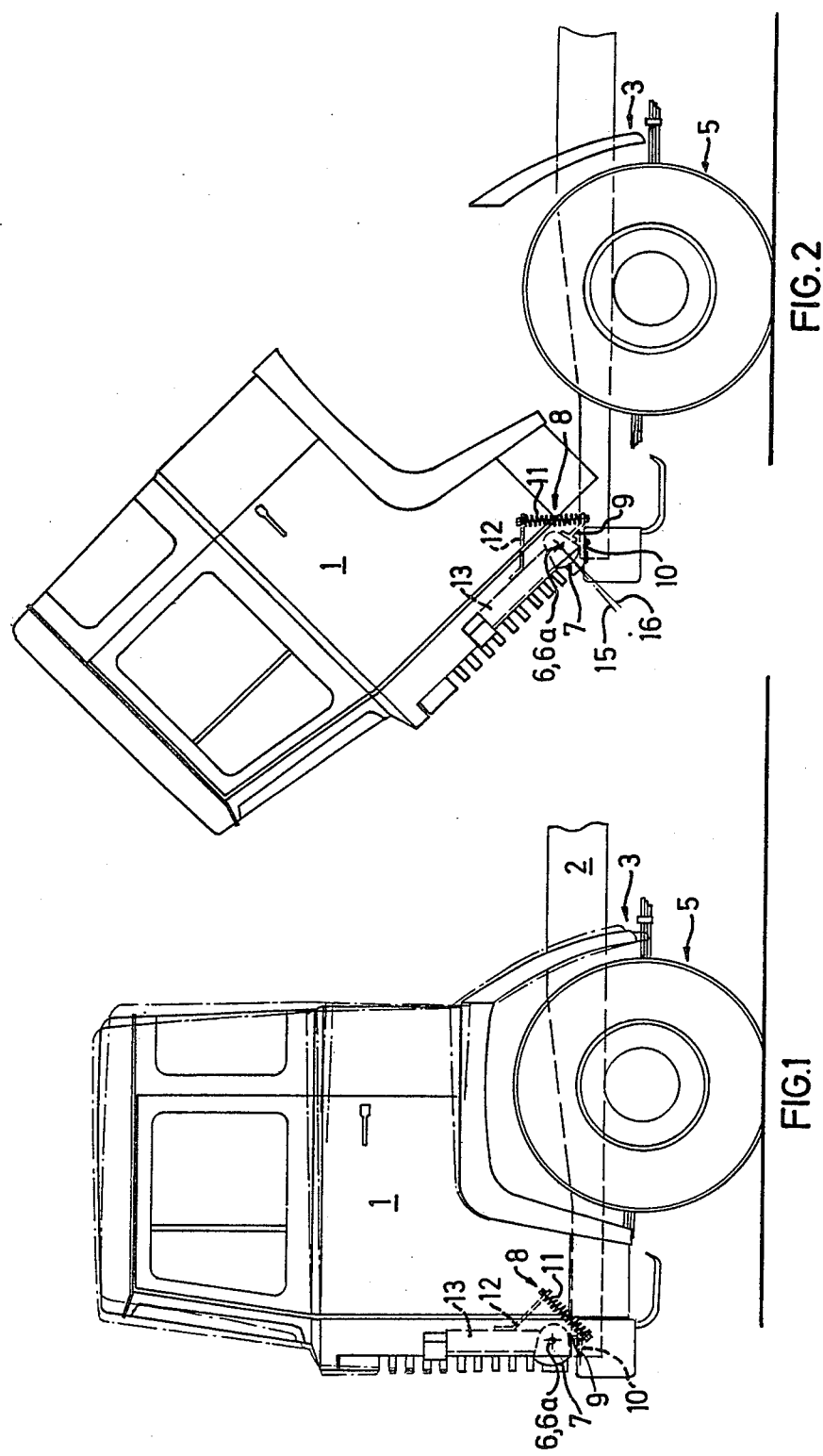

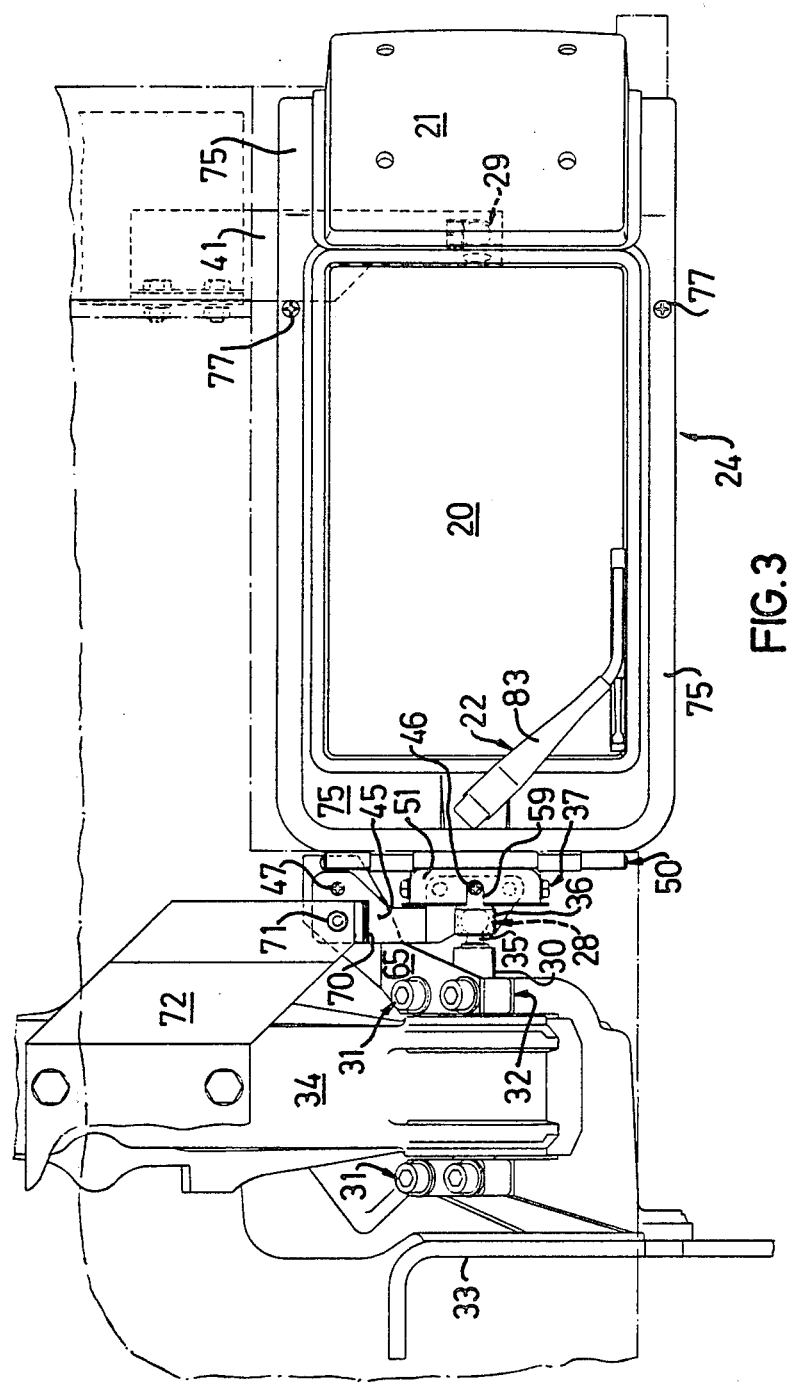

ARRANGEMENT FOR A LIGHTING UNIT IN VEHICLES

The present invention relates to an arrangement for front lighting units in wheeled vehicles equipped with a supporting chassis and a bodywork portion pivotably mounted relative to the vehicle chassis, e.g. a driver's cabin of a vehicle.

In arrangements for front lighting units in vehicles of the above-mentioned kind, it is known to arrange headlights in fixed installations in a forwardly mounted bodywork unit, e.g. in the front of a driver's cabin on a truck of the so-called cab-over-engine type. In such arrangements, the headlights accompany the movements of the driver's cabin relative to the ground, and this causes variations in the sight range of the lighting and also involves a risk of dazzling drivers of on-coming vehicles. The said disadvantages are especially noticable when, for reasons of comfort, the driver's cabin is on a sprung suspension on the vehicle chassis, which thereby gives rise to not inconsiderable relative movements between the driver's cabin and the vehicle chassis in travelling along uneven road surfaces. With the object of avoiding a negative action on the headlight setting in said relative movements between the driver's cabin and the vehicle frame, it is known to fit the headlights in a front bumper rigidly connected to the vehicle chassis. An undesired transmission of movement to the headlight setting is indeed prevented thereby, but the necessary lowering of headlight location relative to the ground involves a reduction of the sight range eliminated by the headlights and furthermore increases the risk of dirtying the headlight glasses.

The present invention has the object of eliminating the disadvantages mentioned above and relates to an arrangement for a front lighting unit in a wheeled vehicle equipped with a supporting vehicle chassis and a bodywork portion movably mounted relative to the vehicle chassis, e.g. the driver's cabin of a vehicle, an engine hood or the like, having a forward front section in the longitudinal direction of the vehicle, characterized in that the lighting unit is adapted to fit into a recess in the front part of the bodywork portion, in that the lighting unit is supported at a transverse horizontal axis substantially coinciding with the axis constituting the fulcrum for the pivoting movements of the bodywork portion, and in that the lighting unit is arranged to assume at least when the bodywork portion is in its normal position, an attitude such that the optical axis of the lighting unit has a definite angular attitude relative to the vehicle chassis.

With the arrangement according to the present invention, the orientation of the optical axis or axes of a lighting unit is influenced by the movements of the vehicle chassis, said movements being considerably less than the movements of a bodywork portion sprung-suspended on the vehicle chassis. The arrangement according to the invention enables a lighting unit to be placed at a suitable height on the bodywork portion, so that illuminative advantages are gained without therefore having to limit the capacity of movement for the suspension means of the bodywork portion. By the arrangement horizontal relative movements between the vehicle chassis and the lighting unit are avoided, thus simplifying the design of an arrangement according to the invention. The arrangement also enables the bodywork portion suspension to be optimal with relation to other parameters, e.g. those affecting driver comfort.

An advantageous embodiment of the arrangement according to the invention applied to wheeled vehicles with a bodywork portion pivotably mounted about a transverse axis at the front end of a vehicle frame is distinguished in that the lighting unit is pivotable about the axis, and in that a control mechanism when the bodywork portion is in its normal position, affects the lighting unit so that the optical axis of the lighting unit assumes the predetermined angular attitude relative to the vehicle chassis.

The invention is further distinguished by the control mechanism for the lighting unit permitting pivoting of the bodywork portion and the lighting unit to a raised position in which the lighting unit attitude is not influenced by the vehicle chassis. Lighting units installed in the front of the bodywork portion can consequently accompany a forward-tipping movement of the bodywork portion without therefore affecting the illuminative advantages when the bodywork portion once again assumes a normal position.

In tipping a truck cabin provided with lighting units arranged in pairs, there are gained design advantages, since details such as footplates, struts etc. associated with the cabin do not need to be placed to go free over a rigidly placed lighting unit. Similarly, gaps between respective lighting units and surrounding outer bodywork can be made considerably less than for lighting units fitted into the bodywork, which is favourable for vehicle care and cleaning and furthermore enables a more aesthetic design of the vehicle front.

Figure 5:
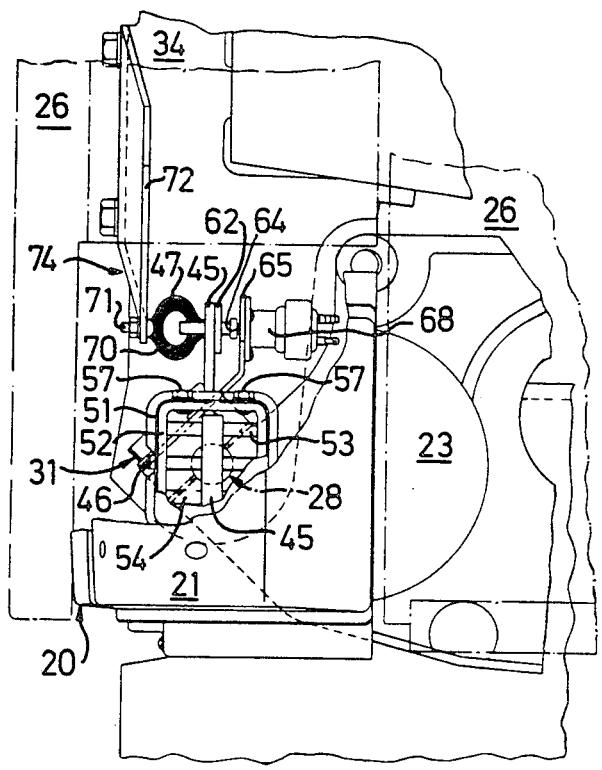

Other distinguishing features of the invention are apparent from the two embodiments exemplifying the invention, which are described while referring to the appended drawings on which:

FIG. 1 shows a side-view of the driver's cabin on a truck, equipped with a headlight arrangement according to the invention, FIG. 2 shows a side-view of the headlight arrangement according to FIG. 1 with the cabin in a forward-tipped position, FIG. 3 shows a front view of an alternative embodiment of the headlight arrangement according to the invention, FIG. 4 shows a plan seen from above of the headlight arrangement illustrated in FIG. 3, and FIG. 5 shows a side-view of the headlight arrangement illustrated in FIG. 3.

In FIGS. 4 and 5, the cut-away portions illustrate details essential to the explanation of the invention, and with the same object certain details are shown with broken lines.

FIG. 1 shows a driver's cabin 1, resiliently suspended on a vehicle chassis 2 connected, by means of conventional wheel suspension means 3, to wheels 5 in contact with the ground, In a manner known per se, the cabin 1 is pivotably mounted via journals (not shown) relative to the vehicle chassis about a horizontal transverse axis 6 at the front end of the vehcicle chassis 2. When driving the vehicle on an uneven substructure, there can occasionally be oscillations of the cabin 1 about the axis 6. Such oscillations, indicated by chain-dotted cabin contour lines in FIG. 1, are however limited by the springing characteristics of a plurality of rear cabin suspension means (not shown), placed between the cabin 1 and the chassis 2.

Two lighting units 7 are fitted into the front of the cabin 1, only one unit being shown in FIGS. 1 and 2. Via two mountings (not shown) each lighting unit 7 is connected to the cabin 1 and hingedly mounted relative to the cabin about a transverse axis 6a with substantially the same fulcrum as for the axis 6. The swivelling position of the lighting unit 7 about the axis 6a is controlled by a control mechanism 8 comprising a downwardly directed strut 9 attached to the lighting unit 7, this strut being urged into abutment against a support means 10 in the vehicle chassis 2 by the bias of a helical spring 11. One end of the helical spring 11 abuts against and/or is attached to the strut 9, and the other end of the helical spring 11 abuts against and/or is attached to a bracket 12 fixed to a supporting post 13 included in the frame of the driver's cabin 1. The supporting means 10 is axially adjustable, whereby the strut 9 can be given different stop positions, thereby enabling different settings of the lighting unit 7.

When tipping the driver's cabin 1 to a forwardly inclined position according to FIG. 2, e.g. when servicing the vehicle, the control mechanism 8 functions in the following way. During a first stage in the tipping movement, the helical spring 11 is successively unloaded by increasing extension until the abutment of the strut 9 against the supporting means 10 ceases. In said pivoting position the helical spring 11 is practically unstressed and providing that the respective spring ends are attached to the strut 9 and bracket 12, the helical spring 11 will, for a continued tipping movement, act as a tension spring and bring with it the strut 9 and thereby the lighting unit.

Alternatively, the helical spring 11 can be placed with a certain pretension between the abutment surfaces on the strut 9 and the bracket 12, respectively, a shaft (not shown) going through the spring 11 limiting the maximum distance between the strut 9 and the bracket 12. A control mechanism 8 designed in such a way allows the strut 9 to be displaced on the shaft while compressing the helical spring 11 when the strut 9 abuts against the supporting means 10.

In both embodiments of the control mechanism 8, the lighting unit 7 is given a swivelling movement first after the cabin 1 has been pivoted a certain tipping angle about the axis 6. Said tipping angle is illustrated in FIG. 2 by two lines 15,16 representing the horizontal plane of symmetry of the lighting unit 7 in the above-mentioned tipped position and the normal position of the cabin 1, respectively.

FIGS. 3–5 illustrate an arrangement according to the invention for a lighting unit 24 comprising a headlight 20, flasher lamp 21, headlight wiper 22 and protective casing 23. The lighting unit 24 is placed in the front of a driver's cabin at a height corresponding to that of the lighting unit 7 in FIG. 1. The chain-dotted lines partly enveloping the lighting unit 24 represent the contours of outer parts 26 of the cabin bodywork.

The lighting unit 24 is swivellably mounted about a transverse, substantially horizontal axis through two ball joints 28,29 connected to the lighting unit 24. The attitude of the lighting unit 24 relative to said axis is controlled by a control mechanism 74. The extension of the axis coincides with the centreline for a transverse shaft 30 attached to a beam 33 in the vehicle chassis via mountings 32 put together by means of screw connections 31, said shaft constituting the journalling shaft for one of the front supporting legs 34 of the driver's cabin, and being the shaft about which the cabin is pivoted to a forwardly inclined position.

The shaft 30 is formed with a ball 35, at its end facing towards the lighting unit 24, which ball coacts with a cup 36 to form the ball joint 28. The cup 36 is attached to a carrying plate 45 included in an adjusting means 37 for setting the beam of the headlight 20. On the other side of the lighting unit 24 the ball joint 29 comprises a ball 38 attached to the protective casing 23 and a ball cup 39 coacting therewith, which ball cup is rigidly connected to a bracket 41 fixedly mounted on one of the cabin corner posts 40. A screw 42 in the ball cup 39 enables simple fitting of the ball joint 29 as well as adjustment of the play between the ball 38 and the cup 39.

As mentioned, the adjusting means 37 for adjusting the headlight 20 beam, comprises the carrying plate 45 to which the ball cup 36 is attached. The carrying plate 45, which is an integrated part of the control mechanism 74, is arranged to engage in a cup 51 in a transverse vertical plane, the cup 51 being rigidly attached to the lighting unit 24. The carrying plate 45 is provided with two set screws 46,47, one set screw 46 being situated in a horizontal plane through the axis defined by the ball joints 28,29. The lateral adjustment of the headlight 20 is regulated by said set screw 46. For this purpose, the set screw 46 coacts with a frame-like insert 52 accommodated by the cup 51, which is rigidly connected to the protective casing 23 by means of welding or the like. The insert 52 is made from a plastics material and its frame construction is suited to the interior shape of the cup 51. The insert 52 is fixed inside the cup 51 by means of screwed joints (see FIG. 5). The insert 52 is also provided with a plurality of transverse holes for the said set screw 46 and for two locating pins 53,54, which are a good fit in two through holes, and which are located one above and the other below the set screw 46, said locating pins 53,54 also going through free-holes in the carrying plate 45.

The above-mentioned construction of the setting means 37 enables preassembly of the carrying plate 45, insert 52, locating pins 53,54 and the set screw 46 into a unit which thereafter can be introduced into the cup 51 and attached thereto by means of the screwed connection 57. The cup 51 is formed with an outwardly open groove 59 enabling the introduction of the set screw 46 in the cup 51. When fitted, the locating pin 53,54 prevent swivelling movements but allow displacing lateral movements between the carrying plate 45 and the cup 50 connected to the lighting unit 24, for the purpose of adjusting the direction of the headlight beam. When fitted, the set screw 46 engages against the inner wall of the cup 51 and is arranged so as not to displace the cup 51 or the insert 52 when turned. In other words, the set screw 46 is locked against axial movement relative to the cup 51 and the lighting unit 24. When the set screw 46 is turned, the coaction of the threads with the carrying plate 45 will result in relative movement between the lighting unit 24 and the carrying plate 45, thus adjusting the headlight 20 beam laterally. The carrying plate 45 is provided with a threaded insert of plastics, whereby the set screw 46 is self-locking.

Adjustment of the headlight beam in height is regulated by the upper set screw 47. The threads of this set screw 47 coact with those of the carrying plate 45 and with a plastics element 62, which is riveted to the carrying plate 45. The thread in the plastics material enables the set screw 46 to be self-locking, as mentioned. When the driver's cabin assumes a normal position, the rear end of the set screw 47 is intended to compulsively engage, as described below, against a stop 64 on a bracket 65 rigidly attached to the vehicle chassis, for controlling the oscillations of the lighting unit 24 about the ball joints 28, 29. When the set screw 47 is turned, the distance between the stop 64 and the carrying plate 45 is altered. The non-rotating connection of the carrying plate 45 to the lighting unit 24 via the locating pins 53,54, insert 52 and cup 51 thereby cause swivelling of the lighting unit 24 about the axis through the ball joints 28,29 which signifies an alteration in the height of the headlight 20 beam.

The bracket 65 is attached to the vehicle chassis by means of the screwed connections 31 on the mounting 32. In a simple embodiment the end of the set screw 47 can engage directly against a stop on the bracket 65, but in the embodiment shown in FIGS. 3-5 the stop 64 is movably arranged on the end of a movable piston rod included in a setting means 68 fixed to the bracket 65, for adjusting the direction of the headlight beam in height in response to the load on the vehicle. The compulsive engagement of the set screw 47 against the stop 64 is provided by the control mechanism 74 which includes a rubber spring 70 which, by means of screwed connections 71, is attached on one side to the carrying plate 45 and on the other side to a supporting plate 72 rigidly attached to the front supporting leg 34 of the driver's cabin. The extension of the piston rod from the setting means 68 coincides with the axial direction of the set screw 47, and the setting means 68 as an entirety constitute a part of level regulation system not more closely described or shown in the figures.

A forward portion of the lighting unit 24 comprises a support frame 75, carrying the headlight 20, headlight wiper means 22 and flasher lamp 21. The support frame 75 is by means of a conventional hinge 50 connected to the protecting casing 23, enabling the forward portion of the lighting unit 24 to be swung out to facilitate service and/or changing lamps. In the normal, i.e. not outwardly swung, position the support frame 75 is attached to the protective casing 23 by a plurality of screws 77, there being an intermediate seal 78 between the two parts. There is also a seal 79 between the support frame 75 and the headlight 20, which is attached by a screwed connection 80 to the support frame 75. An outgoing shaft from a wiper motor 81 included in the headlight wiper means goes through a free hole 82 made in the support frame 75, and a wiper 83 non-rotatably attached to said shaft is only partly shown on the FIGS. 3 and 4.

The described arrangement according to the invention functions as follows. When the driver's cabin is in a normal downward position, the cabin can be given oscillating movements about the shaft 30 in response to unevennesses in the substructure travelled on. Such an oscillation results in that the support plate 72 attached to the front supporting leg 34 of the cabin executes a movement which can be regarded as horizontal in practice. The rubber spring 70, one end of which is attached to the support plate 72, will thereby be subjected to an alteration in length which, with the oscillation in question, can however always be kept within such limits that the rubber spring 70 functions as a compressive spring to ensure that the rear end of the set screw 47 engages against the stop 64. In spite of the oscillating movements of the cabin, the lighting unit 24 is kept in firm contact with the vehicle frame by means of the rubber spring 70 of the control mechanism 74. The sight range of a lit headlight will therefore not be affected by the cabin movements in the arrangement according to the invention.

When the cabin is tipped about the axis 30, the support plate 72 will depart from the carrying plate 75 and cause the spring 70 to be extended, whereby sufficient tensional force arises in the spring 70 to swivel the lighting unit 24 about the ball joints 28,29 via the carrying plate 45. Up to a certain tipping angle, the firm connection of the lighting unit 24 with the vehicle chassis does, however, remain. At said tipping angle, the connection is relinquished and in the continued tipping movement, the lighting unit 24 accompanies the tipping movement of the cabin. By the lighting unit 24 accompanying the cabin tipping movement, the design of details on the cabin adjacent to the lighting unit 24 is facilitated. Said details do not namely need to be placed and shaped with the large distances to the lighting unit 24 which would otherwise be necessary for the details to go free from a lighting unit fixedly mounted on the vehicle chassis. In the arrangement according to the invention, the spaces between the lighting unit 24 and surrounding portions 26 of the cabin bodywork can instead be kept narrow, and the details connected with or constituting a part of the cabin can also be allowed to extend below the lighting unit 24, which is often desirable with regard to footplates, for example, to facilitate access to the cabin.

Adjustment of the lighting pattern and lighting direction of the headlight 20 takes place by means of the set screws 46,47 on the setting means 37. Before the set screws 26,47 are accessible from the outside, a forward cover plate 46 must be swung away or removed. The adjustment in height and laterally of the light pattern takes place by means of the set screws 46,47 completely independent of each other, since turning one set screw does not affect a setting already made with the other screw. Since both headlight 20 and headlight wiper means 22 are fixedly mounted in the lighting unit 24, the adjustment of the light pattern of the headlight 20 will not result in altered conditions for the action of the wiper against the glass of the headlight 20.

The present invention is not bound to the ememplified embodiments but can, within the scope of the following claims, be varied in a plurality of alternative embodiments. It is thus not necessary for the swivelling axis of the lighting unit to be in line with the axis for the oscillating movement of the bodywork portion. If this is not the case, the lighting unit will, because of its proximity to the oscillating axis of the cabin, execute a small oscillating movement about said axis, and thereby it will move relative to the vehicle chassis when the cabin is given spring movements while driving. The connection between the lighting unit and the chassis must thereby be designed to take up such relative movement without this affecting the height setting of the headlight. From the design aspect, this can be solved by having an arm rigidly connected to the lighting unit provided with a guiding roller engaging and coacting with a guiding rail or the like in a supporting element fixed to the vehicle frame. The track of the guiding rail can have an open end enabling the roller and thereby the lighting unit to come in and out of engagement with the track in conjunction with tipping the cabin. Other equivalent mechanisms can also be used for the same purpose, e.g. a rod on the lighting unit can coact with a mounting fixed to the frame, allowing the rod axial movements but otherwise controlling the position of the rod and thereby the oscillating movement of the lighting unit.

What we claim is:

1. An arrangement for a front lighting unit in a wheeled vehicle comprising a vehicle chassis frame and a vehicle body portion which is pivotably mounted relative to the vehicle chassis frame for swinging movement about a transverse axis at the front end of the vehicle chassis frame, said vehicle body portion having a forward front section with a recess in which the lighting unit is adapted to fit, said lighting unit being supported at a transverse horizontal axis substantially coinciding with the axis constituting the fulcrum for the pivoting movements of the vehicle body portion, and said lighting unit having an optical axis and being arranged to assume an attitude such that the optical axis of said lighting unit has a definite angular attitude relative to the vehicle chassis frame when the vehicle body portion is in its normal position.

2. An arrangement as in claim 1 including a control mechanism for pivoting the lighting unit about said horizontal transverse axis such that when the body portion is in its normal position the optical axis of the lighting unit assumes a predetermined angular attitude relative to the vehicle chassis.

3. An arrangement as in claim 2 wherein the control mechanism comprises at least one spring means that absorbs and prevents transfer of movement to the lighting unit when the body portion moves relative to the vehicle chassis.

4. An arrangement as in claim 3 wherein said control mechanism permits pivoting of the body portion and the front lighting unit to a raised position in which the lighting unit attitude is not influenced by the vehicle chassis.

5. An arrangement as in claim 1 wherein the lighting unit comprises a headlight and a wiper means for cleaning the headlight.

6. An arrangement as in claim 5 including a mechanism for regulating the adjustment of the headlights arranged at the connection between the lighting unit and the vehicle chassis.

7. An arrangement as in claim 6 wherein the lighting unit is supported by two joints, one on each side of the head light, and wherein one of the joints is rigidly connected with the vehicle chassis while the other joint is rigidly connected with the body portion.

8. In a front lighting arrangement for a wheeled vehicle: a vehicle chassis frame having a longitudinal axis; a vehicle body portion pivotably mounted to the vehicle chassis for swinging movement about a pivot axis which is located at the front end of the vehicle chassis and which is transverse to the longitudinal axis of the vehicle chassis, said body portion having a forwardly facing recess; a front lighting unit having an optical axis; means mounting said lighting unit in said recess at a transverse horizontal axis substantially coinciding with the pivot axis of said body portion so that the optical axis of said lighting unit lies at a predetermined angle to the longitudinal axis of the vehicle chassis.

* * * * *